United States Patent Office 3,529,230
Patented Sept. 15, 1970

3,529,230
BATTERY TESTING APPARATUS
David C. Tedd, Cornwells Heights, Pa., assignor to Eaton Yale & Towne Inc., Cleveland, Ohio, a corporation of Ohio
Filed Sept. 20, 1967, Ser. No. 669,001
Int. Cl. H02j 7/04
U.S. Cl. 320—48        21 Claims

ABSTRACT OF THE DISCLOSURE

Apparatus is disclosed for periodically testing the state of charge of the battery of an electrically power forklift truck. Each time the truck's drive motor is deenergized, a test load is connected across the battery for a predetermined interval so that the battery voltage during this period is an accurate indication of the condition of the battery. If the battery voltage under the test load is below a preselected level, an indicator is energized to advise the truck operator of this fact. After a predetermined delay following the energization of the indicator, means are automatically operated for preventing the operation of the truck's lifting apparatus and then, after a further delay, means are operated for preventing operation of the truck's motor. In this way, damage to the battery through overdischarge is prevented and yet the operator of the truck is given time in which to complete an operation then in progress when the indicator is energized and to return the truck to a place where its batteries can be recharged.

BACKGROUND OF THE INVENTION

This invention relates to battery testing apparatus and more particularly to such apparatus which will prevent damage to a storage battery by overdischarge thereof.

While various battery testing systems have been proposed heretofore, the operation of such systems has typically been adversely affected by variable loads such as the electrical loads imposed by a forklift truck. Further, such systems typically provided only an indication of this charge so that damage to the battery from overdischarge could still occur if the truck operator ignored the indication.

SUMMARY OF THE INVENTION

Among the several objects of the present invention may be noted the provision of battery testing apparatus which will provide a very accurate indication of the condition of the battery; the provision of such apparatus which is unaffected by variable operating loads; the provision of such apparatus which does not itself place a significant power drain on the battery; the provision of such apparatus which will prevent damage to a storage battery through overdischarge thereof; the provision of such apparatus which will provide adequate warning to the operator of an electrically powered truck so that he may have the battery recharged without the occurrence of a stoppage during actual working; the provision of such apparatus which will prevent initial operation of the truck if the battery is not charged to a preselected level; the provision of such apparatus which is reliable and which is relatively simple and inexpensive. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
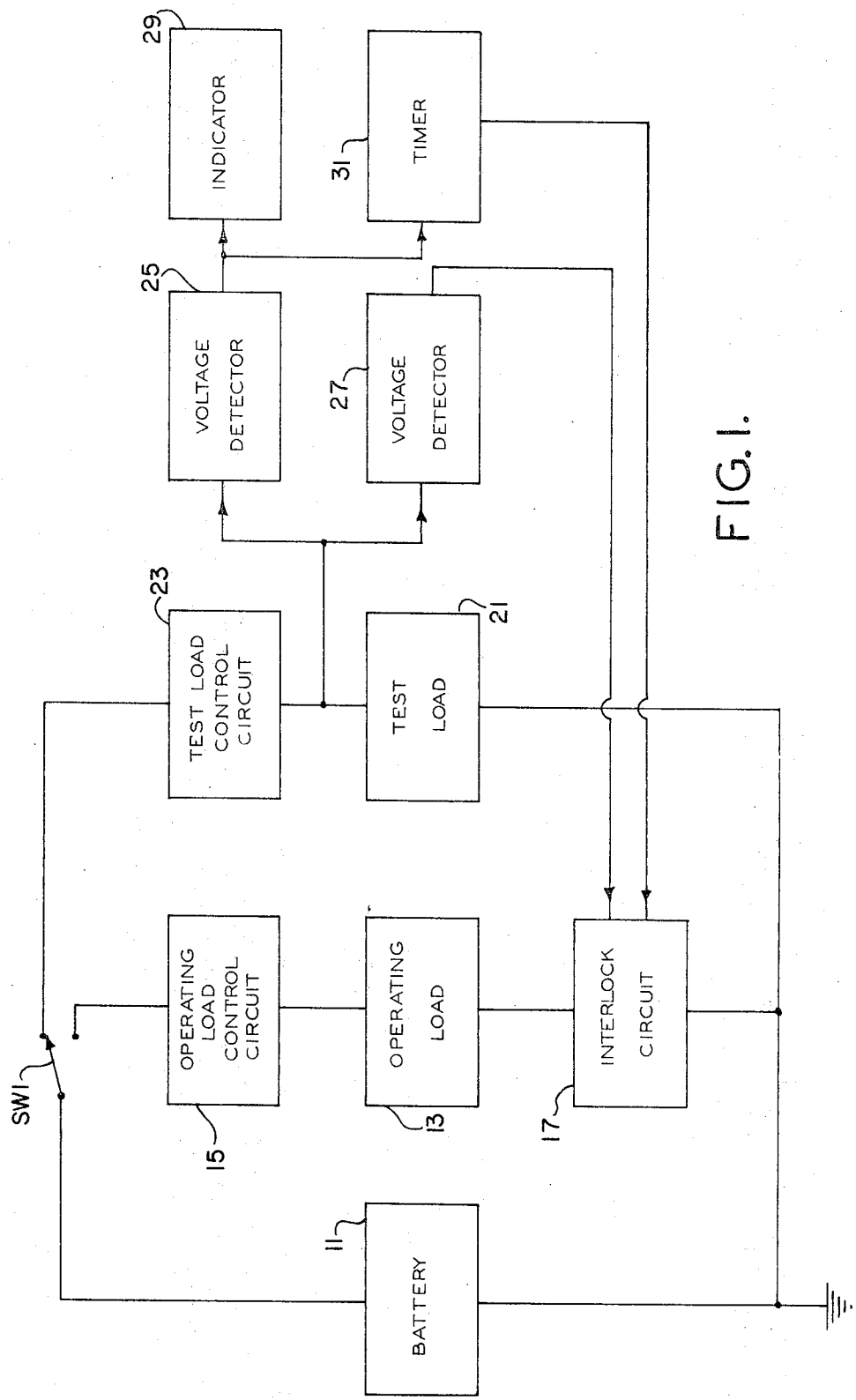
FIG. 1 is a block diagram illustrating the operation of battery condition testing apparatus according to this invention.

Referring now to FIG. 1 there is indicated at 11 a storage battery which may, for example, be of the large capacity type conventionally employed in electrically operated trucks. An operating load 13 which may, for example, be the traction motor of an industrial truck is connected across battery 11 through a circuit which includes one side of a double-throw switch SW1 and suitable power control circuit 15, e.g., of the pulse-width power modulation type, which allows the load 13 to be variably energized. The circuit connecting the operating load 13 to battery 11 preferably also includes an interlock circuit 17 which operates to prevent energization of load 13 by the control circuit 15 under certain circumstances described hereinafter.

A test load 21 is connected across battery 11 through a circuit which includes the other side of switch SW1 and a test load control circuit 23. Test load circuit 23 is operative to energize test load 21 for a predetermined interval when power is supplied to the test load control circuit by means of switch SW1, the operating load circuit being simultaneously deenergized. The size of the test load 21 is chosen in relation to the characteristics and capacity of battery 11 so that the battery voltage which is provided when this predetermined load is energized is an accurate indication of the condition or charge of the battery. This test voltage is applied to a pair of voltage detector circuits 25 and 27. Voltage detector 27 operates interlock circuit 17 to permit energization of the operating load when the test voltage exceeds a preselected threshold. This threshold level is chosen so that it will be exceeded by the test voltage only if the battery is charged to a substantial portion of its capacity, e.g., 30%. If the voltage does not exceed this threshold, indicating that battery 11 is not charged to the desired level, the operating load 13 cannot be energized and thus initiation of operations with an undercharged battery is prevented.

Voltage detector 25 controls the operation of an indicator 29 so as to provide an indication if during operations, the voltage during one of the test periods falls below a second preselected level. In the case of an electric truck this indication serves to inform the operator that he should return to a charging station to have the battery 11 brought up to the desired level of charge. Simultaneously with operating indicator 29 voltage detector 25 starts a timer 31 which provides a preselected delay period. At the end of this period, timer 31 operates the interlock circuit 17 to prevent further energization of the operating load 13 even though the control circuit 15 would otherwise energize the load. Thus, even if the signal provided by indicator 29 is ignored, battery 11 is protected from damage caused by overdischarging.

Figure 2:
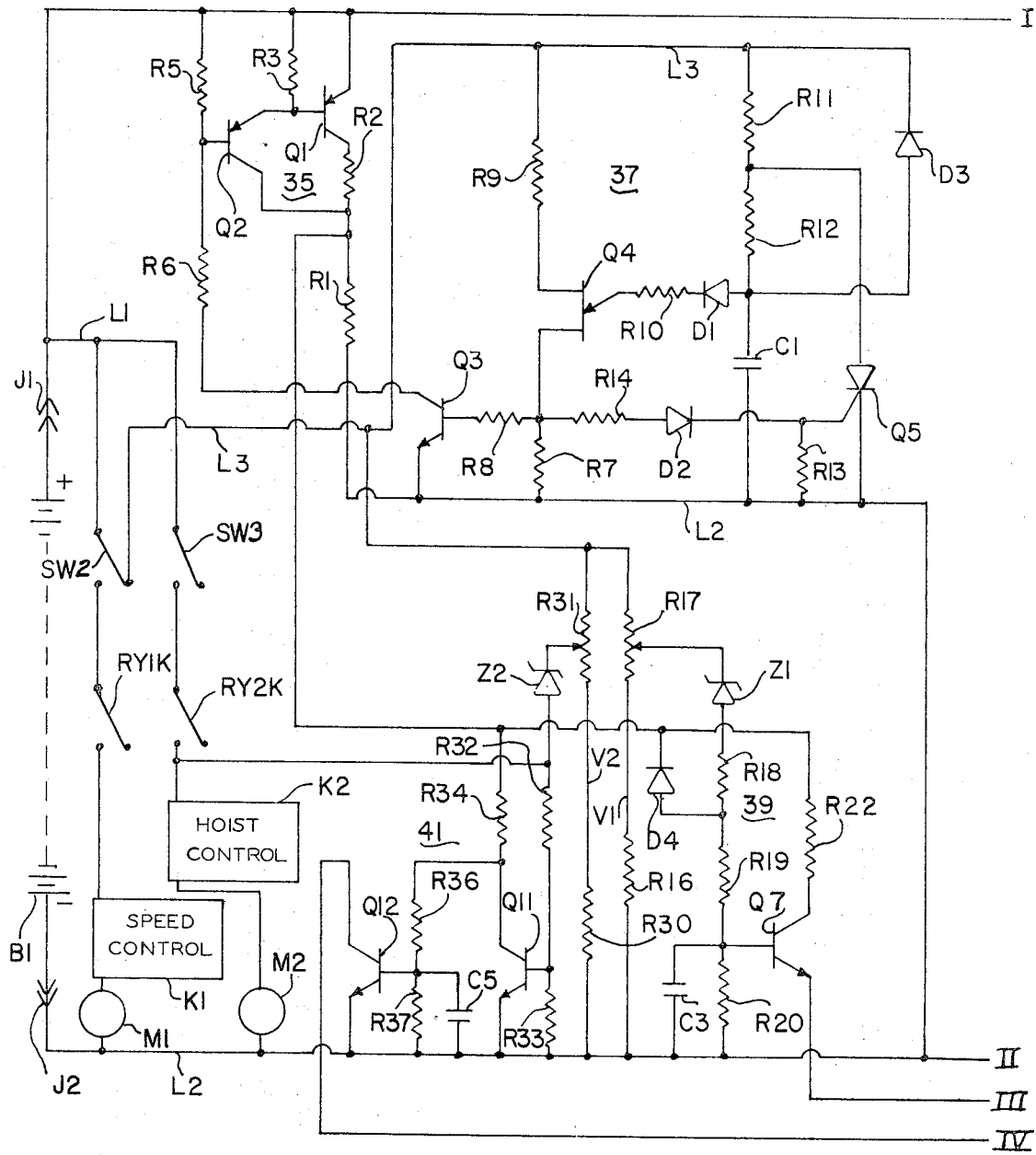
FIGS. 2 and 3 together are a schematic circuit diagram of battery testing apparatus of this invention in a forklift truck, connections between the two figures being indicated by corresponding Roman numerals.
Figure 3:
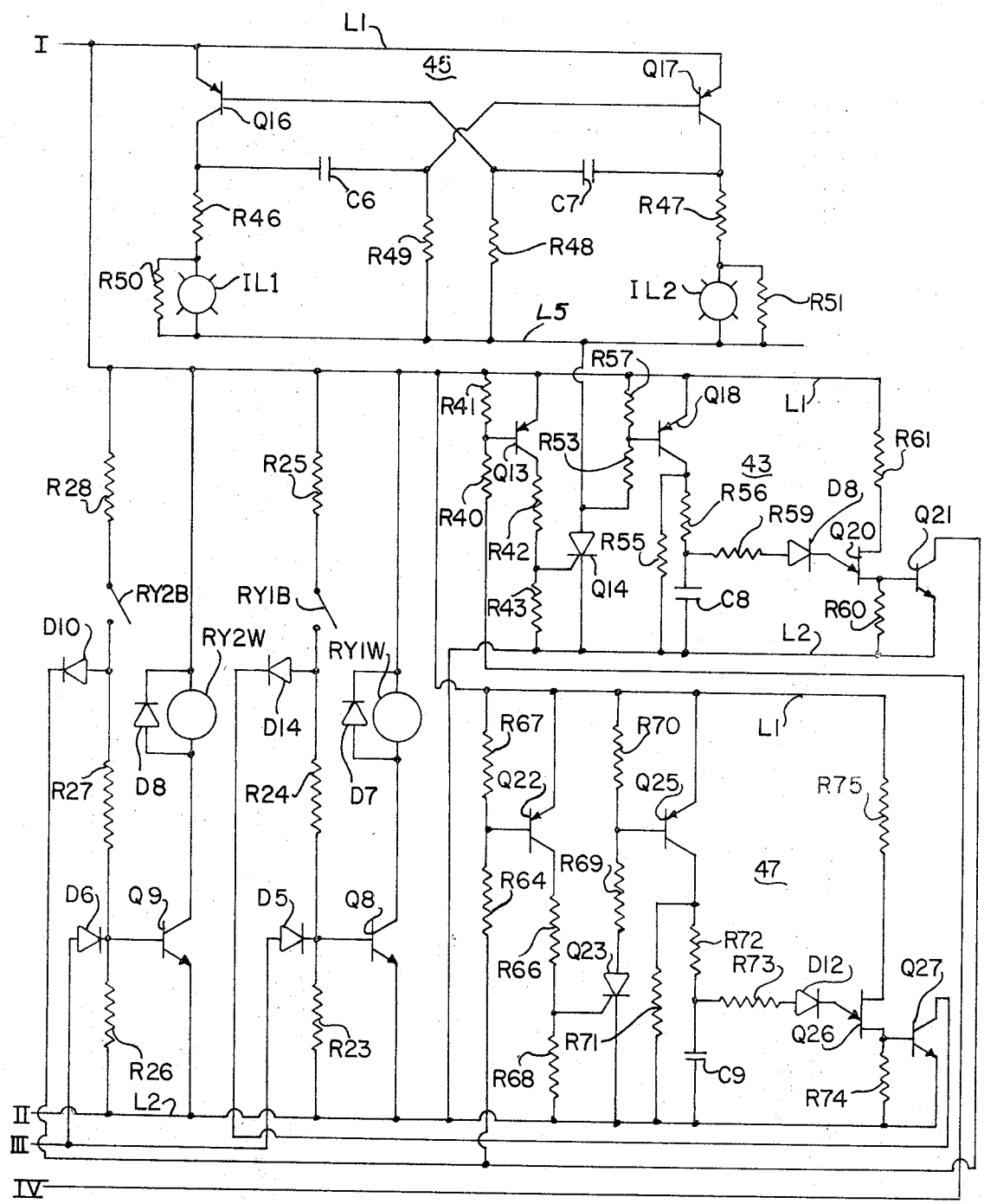

In FIGS. 2 and 3 a particular application of a protective system of this invention to an electric lift truck is illustrated. A battery B1 is connected, by means of jacks J1 and J2, between a pair of supply leads L1 and L2. Lead L2 constitutes the local ground. The truck includes a traction motor M1 and a speed control K1 for varying the energization of the traction motor. Motor M1 and its speed control K1 are connected across leads L1 and L2 through a circuit which includes a set of normally-open relay contacts RY1K and one side of a double-throw switch SW2. Relay contacts RY1K constitute an interlock means such as indicated at 17 in FIG. 1. The truck also includes a hoist motor M2 which is controlled by a hoist control circuit K2 to operate the truck's lifting equipment in conventional manner. Hoist motor M2 and its control circuit K2 are connected across leads L1 and L2 by a circuit which includes a set of normally-open relay contacts RY2K and a switch SW3. Contacts RY2K constitute an interlock means for preventing operation of the hoist motor under circumstances described hereinafter.

When switch SW2 is in position illustrated in FIG. 2, battery voltage is applied to a supply lead L3 for energizing a test load control circuit. A resistor R1 constitutes a test load such as indicated at 21 in FIG. 1 and this resistor is connected between leads L1 and L2 by a circuit which includes the emitter-collector output circuit of a PNP power transistor Q1 and a resistor R2. The base of transistor Q1 is biased toward cutoff by a resistor R3. A PNP transistor Q2 drives transistor Q1 in a so-called Darlington amplifier configuration, the emitter of transistor Q2 being connected directly to the base of transistor Q1 and the collector of transistor Q2 being connected to the junction between resistors R1 and R2. The pair of transistors Q1 and Q2 thus constitute a current switching means 35 for selectively energizing the test load resistor R1. As noted previously, the value of resistor of R1 is selected in relation to the capacity of battery B1 so that a voltage representative of the charge of the battery is obtained when resistor R1 is energized. As resistor R2 may draw a very substantial current additional pairs of transistors similar to transistors Q1 and Q2 may be connected in parallel to handle the test load current.

The base circuit of transistor Q2 is driven from the collector of an NPN transistor Q3 through a voltage divider comprising a pair of resistors R5 and R6. Transistor Q3 is operated in a common emitter mode and is driven by a timing circuit 37 comprising a unijunction transistor Q4. The base-one terminal of unijunction transistor Q4 is connected to lead L2 through a resistor R7 and to the base of transistor Q3 through a resistor R8. The base-two terminal of transistor Q4 is connected to lead L3 through a resistor R9. One side of a timing capacitor C1 is connected to lead L2 and its other side is connected to the emitter of unijunction transistor Q4 through a diode D1 and a resistor R10. Capacitor C1 is charged from lead L3 through a network comprising resistors R11 and R12. As is understood by those skilled in the art, unijunction transistor Q4 is a voltage sensitive breakdown device and thus, when line L3 is energized, capacitor C1 will charge to a voltage determined by the intrinsic standoff ratio of transistor Q4 at which point that transistor will fire applying a current pulse of predetermined duration to the base of transistor Q3. This current pulse forward biases and thus turns on transistor Q3 which in turn turns on transistor Q2 and Q1 to energize the test load R1. The duration of the current pulse and hence also the duration of the energization of test load R1 is determined substantially by the relative values of resistor R10 and capacitor C1.

The junction between resistors R11 and R12 in the timing circuit is connected to the ground lead L2 through the anode-cathode circuit of an SCR (silicon controlled rectifier) Q5. The gate of this SCR is biased to ground through a resistor R13. The base-one terminal of unijunction transistor Q4 is connected to the gate of SCR Q5 through a resistor R14 and a diode D2 thereby to trigger the SCR into conduction when the unijunction transistor Q4 fires. Conduction through SCR Q5 pulls the voltage at the junction between resistors R11 and R12 down to a low value so that capacitor C1 does not recharge after transistor Q4 fires. Thus unijunction transistor Q4 fires only once each time power is applied to the lead L3 through switch SW2. A diode D3 connects capacitor C1 to lead L3 so that the capacitor discharges when lead L3 is not energized.

The voltage pulse generated across the test load resistor R1 controls the operation of a pair of voltage detection circuits 39 and 41. In the circuit 39 a voltage divider V1 comprising a resistor R16 and a potentiometer R17 is connected between lead L3 and the ground lead L2 so that the divider is energized from the battery when switch SW2 is in the position shown. The adjustable tap of potentiometer R17 is connected, through a Zener diode Z1 and a pair of resistors R18 and R19 to the base of an NPN transistor Q7 which is operated as an emitter follower. The base of transistor Q7 is also connected to the ground lead L2 through a resistor R20 which biases the transistor toward cut off and through a capacitor C3 which shunts high frequency transients. The collector of transistor Q7 is connected, through a resistor R22, to the junction between the test load resistor R1 and the resistor R2. The junction between resistors R18 and R19 is also connected to the junction between resistors R1 and R2 through a diode D4.

When the test load resistor R1 is not energized, transistor Q7 cannot conduct since its collector supply voltage is taken from the test load. Further, the bias current which may be provided through resistor R19 is shunted away or cut off by diode D4 when test load resistor R1 is not energized.

When the test load resistor R1 is energized, transistor Q7 conducts only if the portion of the battery voltage preselected by the adjustment of potentiometer R17 exceeds the breakdown voltage of Zener diode Z1. If the battery voltage does exceed the respective threshold preselected by adjustment of potentiometer R17, transistor Q7 is turnd on during the energization of the test load and output current is provided at the emitter of transistor of Q7.

The emitter of transistor Q7 is connected, through respective diodes D5 and D6, to the bases of a pair of NPN transistors Q8 and Q9 (see FIG. 3). The emitter of transistor Q8 is connected to the ground lead L2 and a relay operating winding RY1W is connected between its collector and supply lead L1 so as to be energized when transistor Q8 conducts. Winding RY1W is shunted by a diode D7 for suppressing inductive switching transients. Winding RY1W operates the interlock relay contacts RY1K described previously to close those contacts when transistor Q8 conducts. The winding also operates a second set of contacts RY1B.

Transistor Q8 is normally biased toward cut off by a resistor R23 connecting its base to ground lead L2 but may be forward biased to a circuit including a pair of resistors R24 and R25 and the relay contacts RY1B. Contacts RY1B are closed when relay winding RY1W is energized thereby completing a circuit between the base of transistor Q8 and supply lead L1. It may thus be seen that this biasing network functions as a holding circuit which tends to maintain the energization of winding RY1W once it has been initially energized.

Transistor Q9 is connected in the manner similar to the connection of transistor Q8 to selectively energize a relay winding RY2W. Winding RY2W is shunted by a diode D8 for suppressing inductive switching transients. Winding RY2W operates the contacts RY2K in the circuit supplying the hoist motor M2 and also a set of contacts RY2B. Transistor Q9 is normally biased toward cut off by a resistor R26 but may be forward biased through a holding circuit including a pair of resistors R27 and R28 and the contacts RY2B.

Referring again to FIG. 2, the other voltage detection circuit 41 includes a voltage divider V2 which is also connected between leads L3 and L2. Divider V2 is similar to the divider V1 and comprises a resistor R30 and a potentiometer R31. The tap of potentiometer R31 is connected, through a Zener diode Z2 and a resistor R32, to the base of an NPN transistor Q11. Transistor Q11 is normally biased toward cut off by a resistor R33 connecting its base to the ground lead L2. The emitter of transistor Q11 is grounded and its collector is connected to the junction between the test load resistor R1 and resistor R2 through a load resistor R34. From the earlier explanation of the operation of transistor Q7, it can be seen that transistor Q11 can conduct only during those periods when the test load resistor R1 is energized and will conduct during those periods only if the portion of the battery voltage selected by adjustment of the potentiometer R31 exceeds the breakdown voltage of Zener Z2. In other words, the battery voltage under test load must exceed a respective predetermined threshold in order to turn transistor Q11 on. The junction between Zener diode Z2 and resistor R32 is connected to the hoist motor circuit between the control K2 and contacts RY2K so that, if the hoist motor M2 is energized during the energization of the test load, transistor Q11 will be forward biased and turned on even if the battery voltage is pulled below the respective threshold by the additional load.

The collector of transistor Q11 is connected, through a resistor R36, to the base of an NPN transistor Q12. Transistor Q12 is normally biased toward cut off by a resistor R37 and high frequency transients are shunted by a capacitor C5 connecting its base to the ground lead L2. The emitter of transistor Q12 is connected to ground lead L2 and its collector is connected, through a resistor R40, to the base of PNP transistor Q13 which comprises a portion of a timing circuit 43 (see FIG. 3). The emitter of transistor Q13 is connected to lead L1 and the transistor is normally biased toward cut off by a resistor R41 connecting its base to lead L1. The collector of transistor Q13 is connected, through a resistor R42, to the gate of an SCR Q14. The cathode of an SCR Q14 is connected directly to lead L2 and its gate is connected through resistor R43 to lead L2.

It will thus be seen by those skilled in the art that if the battery voltage is above the respective threshold determined by the setting of potentiometer R31 so that transistor Q11 is turned on when the test load resistor R1 is energized, conduction through the collector circuit of transistor Q11 prevents transistor Q12 from being turned on. Transistor Q13 will thus also remain turned off and SCR Q14 will not be triggered. If, however, the battery voltage under test load does not exceed this threshold, transistor Q12 will conduct during the energized of the test load resistor R1 thereby turning on transistor Q13 which will in turn trigger SCR Q14, SCR Q14 is a triggerable semiconductor current switching device which when triggered, will continue to conduct even though the test load resistor R1 subsequently deenergized.

The anode of SCR Q14 is connected to a lead L5 for energizing an indicator circuit 45 when the SCR conducts. Indicator circuit 45 comprises a pair of indicator lamps IL1 and IL2 which are selectively energized by respective transistors Q16 and of 17. Transistors Q16 and Q17 are interconnected in a free running multivibrator circuit for energizing the indicator lamps IL1 and IL2 alternately at a relatively rapid rate when power is applied to lead L5 thereby to provide an attention-getting display. The emitters of transistors Q16 and Q17 are conneced directly to lead L1 and their collectors are connected, through respective resistors R46 and R47 and the respective lamps IL1 and IL2, to the lead L5. Cross coupling between the transistors is provided in conventional manner by respective capacitors C6 and C7 which connect the collector of each transistor to the base of the other transistor of the pair. The transistors Q16 and 17 are forward biased by resistors R48 and R49 connecting their bases to leads L5. The indicator lamps IL1 and IL2 are shunted by respective resistors R50 and R51 which provide a load for the respective transistor if the lamp should burn out so that, in such an event, the other lamp will continue to operate.

The anode of SCR Q14 is also connected, through a resistor R53, to the base of a PNP transistor Q18. The emitter of transistor Q18 is connected to the lead L1 and its collector is connected to lead L2 through a load resistor R55 and to one side of a timing capacitor C8 through a resistor R56. Transistor Q18 is normally biased toward cut off by a resistor R57 connecting its base to lead L1 but when SCR Q14 is triggered, transistor Q18 is forward biased and a positive voltage is produced at its collector. Accordingly, when SCR Q14 is triggered, capacitor C8 begins to charge through resistor R56. The values of capacitor C8 and resistor R56 are chosen to provide a relatively long time constant, e.g., on the order of ten minutes. The voltage on capacitor C8 is applied, through a resistor R59 and a diode D8, to the emitter of a unijunction transistor Q20. The base-one terminal of unijunction transistor Q20 is connected to lead L2 through a resistor R60 and its base-two terminal is connected to lead L1 through a resistor R61. The base-one terminal of transistor Q20 is also connected to the base of an NPN transistor Q21 so as to forward bias and turn on that transistor when unijunction transistor Q20 fires. As is understood by those skilled in the art, transistor Q20 is a voltage sensitive breakdown device and will fire when the voltage on capacitor C8 reaches a level or threshold determined by the intrinsic standoff ratio of unijunction transistor Q20.

The collector of transistor Q21 is connected, through a diode D10, to a junction which is between the resistors R27 and R28 in the holding circuit which forward biases the transistor Q9 to maintain energization of the interlock relay operating winding RY2W. When transistor Q21 conducts, the voltage at this junction is pulled to a low level and thus the forward bias is withdrawn from transistor Q9. Accordingly, the relay winding RY2W will be deenergized and the holding circuit will be broken by the opening of contacts RW2B. The simultaneous opening of contacts RY2K breaks the circuit to the hoist motor M2 thereby preventing further operation of the truck's forklift.

The collector of transistor Q21 is also connected, through a resistor R64, to the base of an PNP transistor Q22 which comprises a portion of a timing circuit 47. Transistor Q22 is normally biased toward cut off by a resistor R67 connecting its base to lead L1. The emitter of transistor Q22 is connected directly to lead L1 and its collector is connected, through a resistor R66, to the gate of an SCR Q23. The gate of SCR Q23 is normally biased toward ground potential by a resistor R68. It can thus be seen that SCR Q23 is triggered into conduction when transistor Q21 is turned on by the firing of unijunction transistor Q20.

The anode of SCR Q23 is connected, through a resistor R69, to the base of PNP transistor Q25 thereby to turn that transistor on when SCR Q23 is conducting. The emitter of transistor Q25 is connected directly to lead L1 and the transistor is normally biased toward cut off by a resistor R70 connecting its base to lead L1. The collector of transistor Q25 is connected to lead L2 through a load resistor R71 and to one side of a timing capacitor C9 to a resistor R72. Accordingly, when SCR Q23 is conducting a positive voltage will be provided at the collector of transistor Q25 and capacitor C9 will charge at predetermined rate through resistor R72. The relative values of resistor R72 and capacitor C9 are chosen to provide a relatively long constant, e.g., on the order of ten minutes. The voltage on capacitor C9 is applied, through a resistor R73 and a diode D12, to the emitter of a unijunction transistor Q26. The base-one terminal of transistor Q26 is connected to lead L2 through a resistor R74 and its base-two terminal is connected to lead L1 through a resistor R75. The base-one terminal of unijunction transistor Q26 is also connected to the base of an NPN transistor Q27 to turn that transistor on when the unijunction transistor fires, the emitter of transistor Q27 being connected to the ground lead L2. As is understood by those skilled in the art, unijunction transistor Q26 will fire when the voltage on capacitor C9 reaches a level or threshold predetermined by the intrinsic standoff ratio of unijunction transistor Q26.

The collector of transistor Q27 is connected, through a diode D14, to a junction between the resistors R24 and R25 in the holding circuit which maintains energization of the interlock relay winding RY1W through transistor Q8. When transistor Q27 conducts, the voltage at this junction is pulled to a low level thereby turning off transistor Q8 independently of the operation of the holding circuit. The relay winding RY1W is therefore deenergized and the holding circuit is broken by the contacts RY1B. Simultaneously, the circuit through which the drive motor M1 is energized is broken by the opening of contacts RY1K.

The operation of this circuit in relation to the normal operation of a forklift truck is substantially as follows, it being initially assumed that the switches SW2 and SW3 are in the positions illustrated. When a battery is initially connected to the truck by means of jacks J1 and J2, power is applied to lead L3 and the timing circuit 37 is energized so that the capacitor C1 begins to charge. After a predetermined short delay, unijunction transistor Q4 fires thereby turning on transistors Q1–Q3 and energizing the test load resistor R1 for a predetermined short test period. The battery voltage during this test load period is sensed by transistor Q7 in relation to the breakdown voltage of the Zener diode Z1. If the battery voltage during this period exceeds a first preselected threshold determined by the setting of potentiometer R17, conduction in transistor Q7 initially energizes transistors Q8 and Q9 which in turn energize the respective interlock relay windings RY1W and RY2W. The energization of these windings is then maintained by the respective holding circuits described previously. The energization of windings RY1W and RY2W allows power to be applied to the drive and hoist motor circuits due to the closure of contacts RY1K and RY2K.

While the relay windings RY1W and RY2W are energized, the drive motor M1 and the hoist motor M2 may be operated in the usual manner by operating the switches SW2 and SW3. Each time the drive motor M1 is deenergized by means of switch SW2, power is applied to lead L3 and the timing circuit 37 operates as described previously to energize the test load resistor R1 for a short predetermined period. The battery voltage during these test periods is sensed by transistor Q11 in relation to the breakdown voltage of Zener diode Z2. If the battery voltage during each such test period exceeds the threshold preselected by adjustment of potentiometer R31, conduction in transistor Q11 will prevent transistor Q12 from being turned on. This second threshold is chosen so that, under test load, the battery voltage will fall below the threshold if the battery is so discharged that extensive further operation of the truck without recharging would be likely to cause damage to the battery. If the battery voltage during one of the test periods fails to exceed this second threshold, transistor Q11 does not conduct and transistor Q12 is turned on by current flowing through resistors R34 and R36. Conduction in transistor Q12 triggers SCR Q14 through transistor Q13 thereby energizing the flashing light indicating circuit 45 to warn the operation of the truck that the battery is in need of recharging before any further extended operations of the truck are attempted.

In addition to energizing the indicator circuit 45, the failure of the battery voltage to exceed the second threshold causes the timing circuit 43 to initiate a timed interval measured by the charging of capacitor C8 through resistor R56. This interval is chosen to be long enough to permit the operator to clear the hoist or forklift of any load with which he was working at the time the indicator circuit 45 was energized. At the end of the first interval, the unijunction transistor Q20 fires causing transistor Q21 to break the holding circuit for the hoist motor interlock relay winding RY2W as described previously. Accordingly, the operator is prevented from operating the hoist motor so as to undertake any further lifting operations.

In addition to deactivating the hoist circuit, the firing of unijunction transistor Q20 causes the timing circuit 47 to start timing an interval determined by the charging of capacitor C9 through resistor R72. After this second period has passed, unijunction transistor Q26 fires causing transistor Q27 to break the holding circuit for the drive motor interlock relay winding RY1W thus preventing any operation of the drive motor of the truck after this second period has passed. This latter period is chosen so that, together with the delay which precedes deenergization of the hoist motor circuit, the operator of the truck has sufficient time to reach a point where the battery B1 can be recharged.

From the foregoing explanation, it can be seen that overdischarging of the battery B1 by the drive and hoist motors M1 and M2 is prevented in spite of any steps which can be taken by the operator and yet the operator is given ample opportunity, after the warning indicator circuit 45 is energized, to return the truck for recharging. In general, knowledge on the part of the operator that the truck will automatically cease functioning within a predetermined time after the indicator lights start to flash is sufficient to induce the desired action on his part, i.e., he will obtain recharging as soon as possible after the indicator lights are energized.

Figure 4:
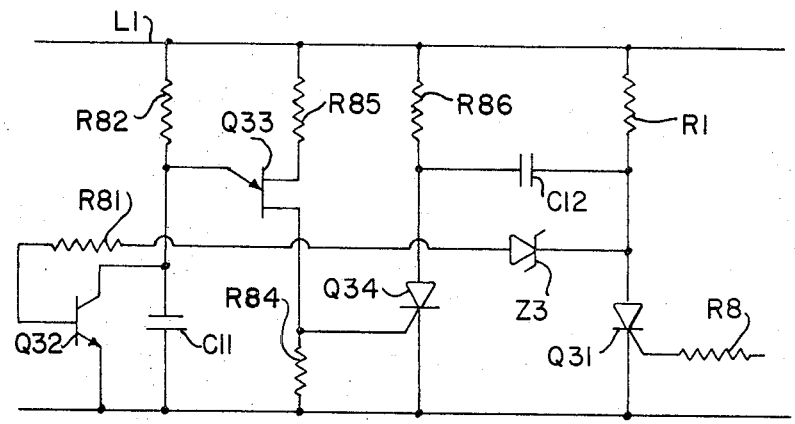
FIG. 4 is a partial schematic circuit diagram illustrating alternative circuitry for energizing a test load in the apparatus of FIGS. 2 and 3.

Instead of being energized by transistors, such as Q1–Q2 in FIG. 2, the test load resistor R1 may be energized by an SCR as illustrated in FIG. 4. In this modification resistor R1 is connected between leads L1 and L2 through the anode-cathode circuit of an SCR Q31. Resistor R8, which comes from the base-one terminal of unijunction transistor Q4 is connected to the gate of SCR Q31 so that the SCR is triggered into conduction when the unijunction transistor fires. The anode of SCR Q31 is connected, through a Zener diode Z3 and a resistor R81, to the base of an NPN transistor Q32. The emitter of transistor Q32 is grounded so the transistor is forward biased into conduction when SCR Q31 is not conducting but is cut off when the SCR is triggered. The collector-emitter circuit of transistor Q32 shunts a timing capacitor C11. Charging current is supplied to capacitor C11 from lead L1 through a resistor R82 so that the capacitor charges when transistor Q32 is cut off but is discharged when that transistor conducts.

The capacitor voltage is applied to the emitter of a unijunction transistor Q33. The base-one terminal of unijunction transistor Q33 is connected to ground lead L2 through a resistor R84 and its base-two terminal is connected to lead L1 through a resistor R85. The base-one terminal of unijunction transistor Q33 is also connected to the gate of an SCR Q34 which is employed for commutating the SCR Q31. The cathode of SCR Q34 is connected to ground and its anode is connected to lead L1 through a load resistor R86. The anode of SCR Q34 is also connected to the anode of SCR Q31 through a capacitor C12.

The operation of this test load energizing circuit is as follows. When SCR Q31 is triggered by the unijunction transistor Q4 following deenergization of the drive motor by switch SW2, the test load resistor is energized by the SCR, transistor Q32 is cut off and capacitor C11 therefore charges through resistor R82. When the capacitor voltage reaches a level determined by the intrinsic standoff ratio of unijunction transistor Q23, that transistor fires triggering SCR Q34. Triggering SCR Q34 causes its anode voltage to drop sharply thereby delivering a negative-going pulse through capacitor C12 to the anode of SCR Q31. As is understood by those skilled in the art, the application of such a pulse will turn off SCR Q31 by reverse biasing its anode-cathode circuit. SCR Q34 is turned off in similar manner when SCR Q31 is next triggered. It can thus be seen that, when SCR Q31 is triggered, the test load resistor R1 is energized for a period determined by the rate at which capacitor C11 is charged through resistor R82.

Figure 5:
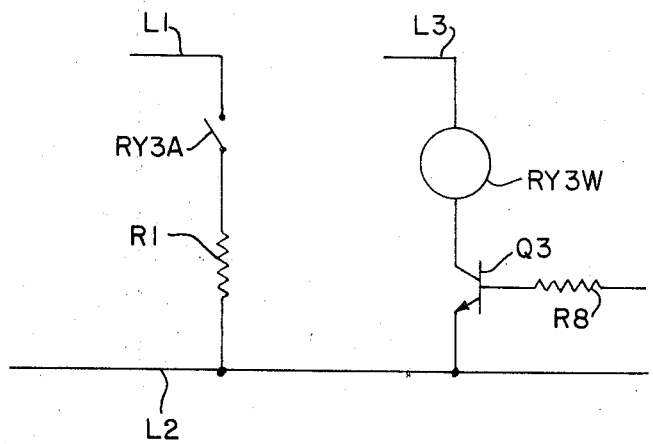
FIG. 5 is a partial schematic circuit diagram of another alternative for energizing a test load.

Another alternative for energizing the test load is illustrated in FIG. 5. In this embodiment, test load resistor R1 is connected across leads L1 and L2 through a set of relay contacts RY3A. These contacts are operated by a relay winding RY3W which is connected between the collector of transistor Q3 and lead L3. Accordingly, when transistor Q3 is turned on by the firing of unijunction transistor Q4, the relay winding RY3W is energized and contacts RY3A are closed for a predetermined period which is substantially equal to the duration of the output pulse of the unijunction transistor Q4. With any of the three disclosed loading systems, the test load is energized only once each time the motor M1 is deenergized and the test energization extends only for a predetermined period. Accordingly, the total power consumed by the test system in normal operations is relatively low.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A battery powered system including a battery, an operating load, control means for selectively energizing said operating load from said battery and battery condition testing apparatus comprising:
   a test load;
   switching means which, when energized, is operative to connect said test load across said battery;
   means responsive to the operation of said control means for energizing said switching means for a predetermined interval when said operating load is deenergized; and
   means for measuring the battery voltage when said test load is so connected whereby said voltage provides an accurate indication of the condition of said battery.

2. Apparatus as set forth in claim 1 wherein said means for energizing said switching means includes timing means for providing a predetermined delay before energizing said switching means after said operating load is deenergized.

3. Apparatus as set forth in claim 2 wherein said timing means includes:
   a timing capacitor;
   means for charging said capacitor at a predetermined rate when said operating load is deenergized; and
   means including a voltage sensitive breakdown device for energizing said switching means for a predetermined interval when the voltage on said capacitor reaches a predetermined threshold.

4. Apparatus as set forth in claim 3 wherein said voltage sensitive breakdown device comprises a unijunction transistor.

5. Apparatus as set forth in claim 4 wherein said switching means comprises a transistor amplifier driven by said unijunction transistor.

6. Apparatus as set forth in claim 4 including means for preventing charging of said capacitor after said unijunction transistor fires whereby said test load is energized only once each time said operating load is deenergized.

7. Apparatus as set forth in claim 6 wherein said means for preventing charging is an SCR which shunts said capacitor and is triggered by said unijunction transistor.

8. Apparatus as set forth in claim 1 including means responsive to said battery voltage for preventing energization of said operating load from said battery if said voltage does not exceed a preselected threshold.

9. Apparatus as set forth in claim 1 including timing means responsive to said battery voltage for initiating a delay of predetermined duration if said battery voltage does not exceed a preselected threshold and including also means for preventing energization of said load after the end of said delay.

10. Apparatus as set forth in claim 9 wherein said timing means includes:
    a triggerable semiconductor current switching device;
    means for triggering said device if said battery voltage does not exceed said preselected threshold;
    a capacitor;
    means for charging said capacitor at a preselected rate when said device is triggered; and
    a voltage sensitive breakdown device responsive to the voltage on said capacitor for operating said means for preventing energization of said operating load when the voltage on said capacitor exceeds a predetermined level.

11. Apparatus as set forth in claim 10 wherein said current switching device is an SCR.

12. A battery powered system including a battery, an operating load, control means for selectively energizing said operating load from said battery and battery protection apparatus comprising:
    a test load;
    switching means which, when energized, is operative to connect said test load across said battery;
    means for energizing said switching means for a predetermined interval when said battery is initially connected to said system; and
    means responsive to the battery voltage when said test load is so energized for preventing energization of said operating load if said battery voltage does not exceed a preselected level thereby to protect said battery.

13. In a battery powered system including a battery, an operating load, and an operating load circuit having control means for selectively energizing said operating load when said battery is connected to said operating load circuit, battery protection apparatus comprising:
    a test load;
    a test load control circuit including means for energizing said test load for a predetermined interval when said battery is connected to said test load control circuit;
    means for connecting said battery to said test load circuit alternately with said operating load circuit thereby to energize said test load once when said battery is initially connected to said apparatus with said operating load circuit deenergized and once after each time said operating load circuit is energized and then deenergized;
    relay means including contacts in series with said operating load for preventing energization thereof by said operating load circuit except when said relay means is energized;
    first means responsive to the battery voltage when said test load is energized for energizing said relay means when the amplitude of one of said pulses exceeds a first preselected threshold; and
    second means responsive to said battery voltage for deenergizing said relay means after the said battery voltage fails to exceed a second preselected threshold, said second threshold being lower than said first threshold whereby said operating load may be initially energized after a battery is connected to said apparatus only if the condition of said battery exceeds a preselected level and will thereafter be prevented from being energized if the condition of said battery falls below a second preselected level.

14. A battery powered lift truck including a battery, selectively energizable drive means for propelling said truck and selectively energizable lift means for lifting a burden to be carried by said truck, battery protection apparatus comprising:

means for automatically measuring the battery voltage under a predetermined load at spaced intervals during operation of said truck;

an indicator;

means for actuating said indicator if said measured battery voltage does not exceed a preselected threshold;

means for preventing energization of said lift means after a first predetermined interval following actuation of said indicator; and means for preventing energization of said drive means after a second predetermined interval following said first interval.

15. Apparatus as set forth in claim 14 wherein said indicator comprises a pair of lamps and a multivibrator circuit for energizing said lamps alternately.

16. Apparatus as set forth in cliam 14 wherein said first and second predetermined intervals are timed by respective unijunction transistor delay circuits.

17. Apparatus as set forth in claim 16 wherein each of said timing circuits includes a timing capacitor, means for charging said capacitor at a preselected rate, and an SCR for selectively energizing the respective charging circuit.

18. Apparatus as set forth in claim 14 wherein said means for measuring said battery voltage includes:

a test load;

switching means which, when energized, is operative to connect said test load across said battery; and means for energizing said switching means for a predetermined interval when said drive means is deenergized whereby the battery voltage under said test load provides an accurate indication of the condition of said battery.

19. Apparatus as set forth in claim 18 wherein said switching means comprises a transistor amplifier.

20. Apparatus as set forth in claim 18 wherein said switching means comprises an SCR.

21. Apparatus as set forth in claim 18 wherein said switching means comprises a relay having contacts in series with said test load.

References Cited

UNITED STATES PATENTS

| | | | |
|---|---|---|---|
| 3,176,210 | 3/1965 | Bethke | 320—40 |
| 3,355,651 | 11/1967 | Olson | 320—48 X |
| 3,356,936 | 12/1967 | Smith | 324—29.5 |
| 3,389,325 | 6/1968 | Gilbert | 320—40 X |

J D MILLER, Primary Examiner

J. M. GUNTHER, Assistant Examiner

U.S. Cl. X.R.

318—139; 320—29, 34; 340—249